United States Patent
Madabhushi Balaji et al.

(10) Patent No.: US 12,510,863 B2
(45) Date of Patent: Dec. 30, 2025

(54) PROJECTOR WITH PHASE HOLOGRAM MODULATOR

(71) Applicant: Texas Instruments Incorporated, Dallas, TX (US)

(72) Inventors: Muralidhar Madabhushi Balaji, Dallas, TX (US); Jeffrey Matthew Kempf, Dallas, TX (US); Terry Alan Bartlett, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 460 days.

(21) Appl. No.: 17/160,060

(22) Filed: Jan. 27, 2021

(65) Prior Publication Data

US 2021/0232093 A1    Jul. 29, 2021

Related U.S. Application Data

(60) Provisional application No. 62/983,790, filed on Mar. 2, 2020, provisional application No. 62/966,283, filed on Jan. 27, 2020.

(51) Int. Cl.
*G03H 1/22*    (2006.01)
*G03H 1/04*    (2006.01)
(Continued)

(52) U.S. Cl.
CPC ......... *G03H 1/2286* (2013.01); *G03H 1/0443* (2013.01); *G03H 1/08* (2013.01);
(Continued)

(58) Field of Classification Search
None
See application file for complete search history.

(56) References Cited

U.S. PATENT DOCUMENTS 9,848,176 B2    12/2017    Damberg et al.
2001/0050787 A1    12/2001    Crossland et al.
(Continued)

FOREIGN PATENT DOCUMENTS

CN    1786823 A  *  6/2006
CN    101301792 A  *  11/2008
(Continued)

OTHER PUBLICATIONS

F.J. Salgado-Remacha, "Reducing the variability in random-phase initialized Gerchberg-Saxton Algorithm", 85 Optics & Laser Tech. 30-34 (Jun. 8, 2016) (Year: 2016).*

(Continued)

*Primary Examiner* — David N Werner
(74) *Attorney, Agent, or Firm* — Michael T. Gabrik; Frank D. Cimino

(57) ABSTRACT

A projection system includes: an illumination source configured to output illumination light; a phase light modulator (PLM) optically coupled to the illumination source, the PLM configured to: receive the illumination light; phase modulate the illumination light while displaying a phase hologram, to produce modulated light; and projection optics coupled to the PLM, the projection optics configured to receive the modulated light and to project an image responsive to the modulated light; wherein both a mean in intensity and a variance in intensity in bright regions of the projected image is greater than the mean intensity and the variance in intensity in dark regions of the projected image.

13 Claims, 7 Drawing Sheets

(51) Int. Cl.
*G03H 1/08* (2006.01)
*G03H 1/10* (2006.01)
*G03H 1/14* (2006.01)
*H04N 9/31* (2006.01)

(52) U.S. Cl.
CPC ............. *G03H 1/0866* (2013.01); *G03H 1/10* (2013.01); *G03H 1/14* (2013.01); *G03H 1/2202* (2013.01); *G03H 1/2294* (2013.01); *H04N 9/3102* (2013.01); *H04N 9/3161* (2013.01); *G03H 2001/2231* (2013.01); *G03H 2210/10* (2013.01); *G03H 2210/12* (2013.01); *G03H 2225/22* (2013.01); *G03H 2225/24* (2013.01); *G03H 2225/32* (2013.01)

(56) References Cited

U.S. PATENT DOCUMENTS

| | | | |
|---|---|---|---|
| 2002/0101644 A1 | 8/2002 | Mei et al. | |
| 2003/0194132 A1 | 10/2003 | Kiyuna | |
| 2009/0002787 A1* | 1/2009 | Cable | G03H 1/2294 359/9 |
| 2009/0128875 A1* | 5/2009 | Christmas | G03H 1/2294 359/29 |
| 2013/0088568 A1* | 4/2013 | Nolte | A61B 5/0075 348/40 |
| 2018/0292786 A1* | 10/2018 | Sakai | G21K 1/006 |
| 2020/0004201 A1* | 1/2020 | Smith | G03H 1/2645 |
| 2020/0041810 A1* | 2/2020 | Sakai | G03H 1/2294 |
| 2020/0063093 A1* | 2/2020 | Matheu | C12N 5/0697 |
| 2020/0326655 A1* | 10/2020 | Chang | G03H 1/32 |
| 2021/0232093 A1* | 7/2021 | Madabhushi Balaji | H04N 9/3135 |
| 2021/0233223 A1* | 7/2021 | Seyler | G03H 1/0465 |
| 2021/0374381 A1* | 12/2021 | Ozcan | G03H 1/0005 |
| 2022/0146982 A1* | 5/2022 | Paxman | G03H 1/0005 |

FOREIGN PATENT DOCUMENTS

| | | | | |
|---|---|---|---|---|
| CN | 102289609 | A * | 12/2011 | |
| CN | 103488036 | A * | 1/2014 | |
| CN | 104915699 | A * | 9/2015 | |
| CN | 106324854 | A * | 1/2017 | ......... G02B 27/0012 |
| CN | 106772822 | A * | 5/2017 | |
| CN | 107087305 | A * | 8/2017 | ......... H04B 17/3911 |
| KR | 20180000783 | A * | 1/2018 | ............... G03H 1/04 |

OTHER PUBLICATIONS

International Search Report and Written Opinion dated Jun. 17, 2021, PCT Application No. PCT/US2021/020237, 7 pages.

R.W. Gerchberg and W.O. Saxton, "A Practical Algorithm for the Determinatio of Phase from Image and Diffraction Plane Pictures", OPTIK, vol. 35, No. 2, 237-246 (1972); accessed Jan. 26, 2021, www.u.arizona.edu/opoon/GerchbergandSaxton1972.pdf.

Andreas Georgiou, "Noise Formation in Fourier phase-only holograms," J. Opt. Soc. Am. B, Nov. 17, 2010, pp. 2677-2686.

J.R. Fienup, "Phase Retrieval Algorithms: A comparison," Applied Optics, vol. 21, No. 15, Aug. 1, 1982, pp. 2760-2769.

Hiroshi Akahori, "Spectrum leveling by an iterative algorithm with a dummy area for synthesizing the kinoform," Applied Optics, vol. 25, No. 5, Mar. 1, 1986, pp. 802-810.

* cited by examiner

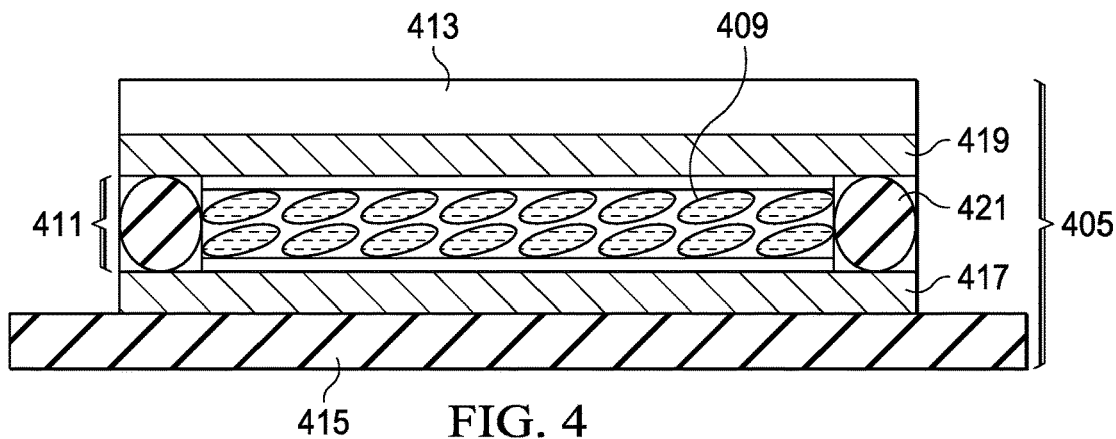
FIG. 4
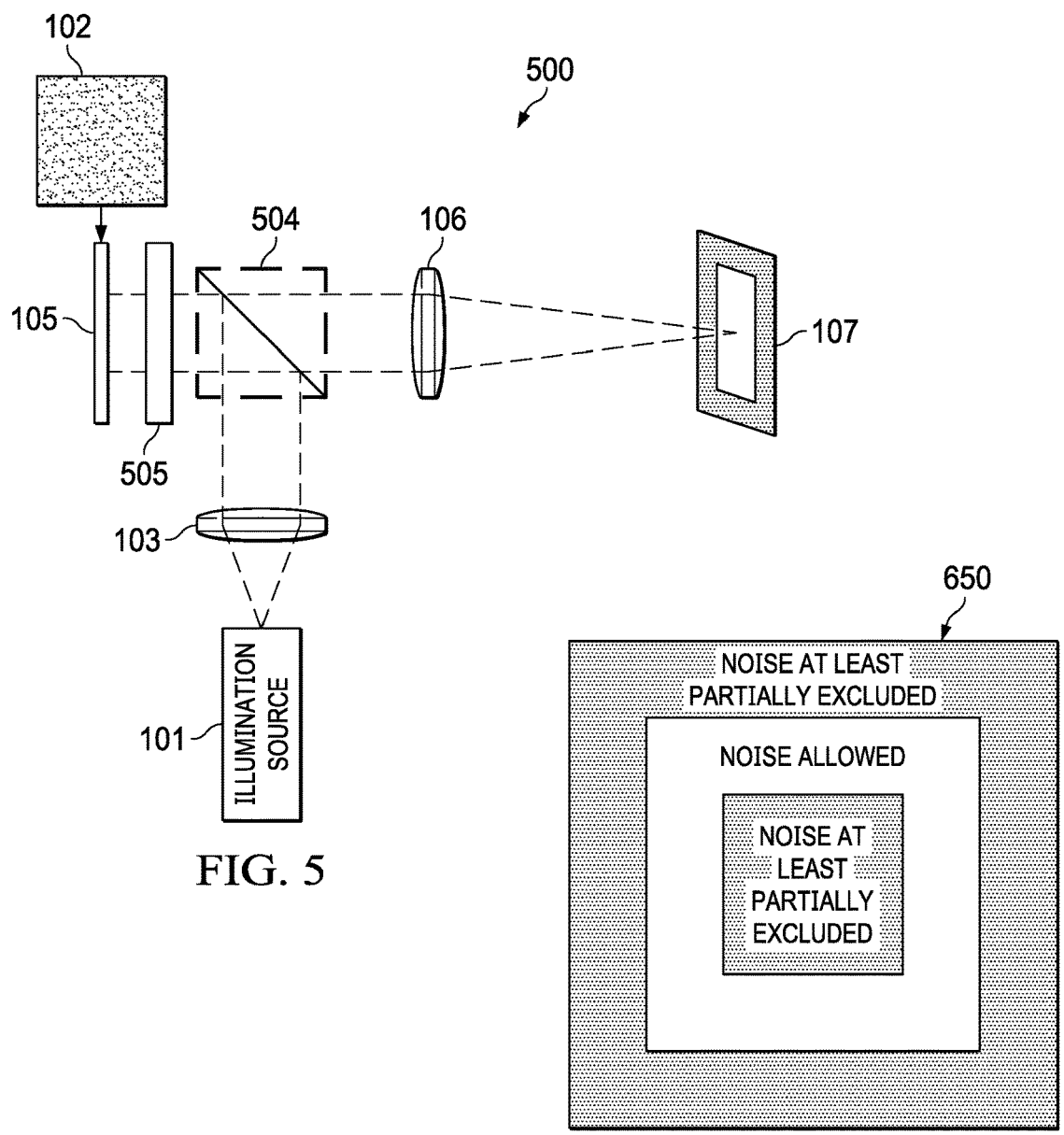
FIG. 5
FIG. 6

PROJECTOR WITH PHASE HOLOGRAM MODULATOR

CROSS-REFERENCE TO RELATED APPLICATIONS

This application claims the benefit of and priority to U.S. Provisional Application No. 62/966,283, filed Jan. 27, 2020, and this application claims the benefit of and priority to U.S. Provisional Application No. 62/983,790, filed Mar. 2, 2020, which Applications are hereby incorporated herein by reference in their entirety.

SUMMARY

A projection system includes: an illumination source configured to output illumination light; a phase light modulator (PLM) optically coupled to the illumination source, the PLM configured to: receive the illumination light; phase modulate the illumination light while displaying a phase hologram, to produce modulated light; and projection optics coupled to the PLM, the projection optics configured to receive the modulated light and to project an image responsive to the modulated light; wherein both a mean in intensity and a variance in intensity in bright regions of the projected image is greater than the mean intensity and the variance in intensity in dark regions of the projected image.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which:

FIG. 4 is a cross-sectional view of a liquid crystal on silicon (LCOS) phase light modulator that is useful with the arrangements.

FIG. 5 is a block diagram for an example arrangement for a projection system with a phase light modulator.

FIG. 6 illustrates a sample image projected using an algorithm of an arrangement.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

Figure 1:
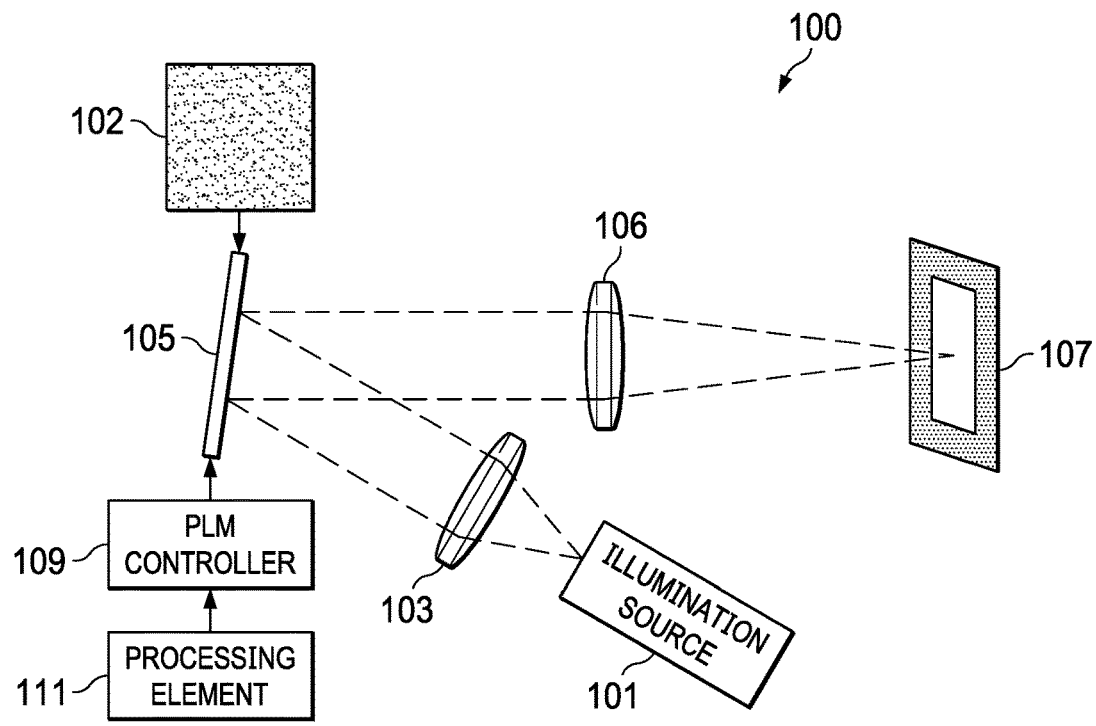
FIG. 1 is a block diagram illustrating elements of a phase light modulation projection system.

The making and using of example arrangements that incorporate aspects of the present application are discussed in detail below. It should be appreciated, however, that the examples disclosed provide many applicable inventive concepts that may be embodied in a wide variety of specific contexts. The specific examples and arrangements discussed are illustrative of specific ways to make and use the various arrangements, and the examples described do not limit either the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled." The term "optically coupled" is used herein. Elements that are "optically coupled" have an optical connection between the elements but various intervening elements may be between elements that are "optically coupled."

The term "phase hologram" is used herein. A phase hologram is a pattern containing phase information that is generated for display on a phase light modulator when amplitude is made constant. The phase hologram is transmitted to a phase light modulator as a two dimensional bitmap. An array of picture elements (pixels) of the phase light modulator move in correspondence with the bitmap, which is stored in storage cells associated with the pixels. The pixels phase modulate illuminating light.

The terms "bright regions" and "dark regions" are used herein to describe portions of a projected image. As used herein, a "bright region" of a projected image is a region with greater intensity, where more light is visible, and the bright regions are regions that have an intensity at least 50% of the maximum intensity, while the maximum brightness that could be found in a bright region is where the maximum possible amplitude of the light is projected. A dark region in a projected image is a region with lesser intensity, a dark region is one with intensity of less than 50% of the maximum intensity. The maximum darkness that could be found in a dark region is where the minimum possible amplitude of the light is projected, which could be zero. In some examples, the image intensity is binary, so that the goal amplitude for a particular pixel in the projected image is either 0 (dark region) or 1 (bright region). The term "noise" is used herein. As used herein, noise is a variance in intensity of light in a region in a projected image. The noise is introduced, in part, by algorithms used to generate a phase hologram that is used to modulate illumination light, and the modulated light is used to project an image. In the arrangements, noise that occurs in projecting an image from a phase light modulator is distributed in the bright regions (amplitude is 1 in the binary case) of a projected image, and noise is reduced or eliminated from the dark regions (amplitude is zero in the binary case) of the projected image. The noise reduction in the dark regions is achieved by the methods used to generate phase holograms used in the arrangements. The images projected using the arrangements have high contrast, as the noise is excluded or minimized in the dark regions, increasing the contrast.

Digital projectors using spatial light modulators (SLMs) are increasingly used. Examples of SLMs include projectors using liquid crystal on silicon (LCOS) light modulators and digital micromirror device (DMD) light modulators. Applications for spatial light modulators include heads up displays (HUD), cinema, television, presentation projectors, headlights, near eye displays, light detection and ranging (LIDAR), automotive console displays, forward looking infrared (FLIR), structured light, spectroscopy, 3D printing, light field displays, communications, and high dynamic range projectors. In some digital projectors and displays, amplitude modulation is used with SLMs. In amplitude modulation, SLMs display patterns corresponding to an image, and an illumination source provides light to illuminate the pattern on the SLM. Modulated light is reflected from the SLM to projection optics which projects an image on a screen or a surface for viewing. Amplitude modulation using SLMs is subtractive. To obtain variable light intensity in the projected images, the SLM either reflects all, or less than all, of the illumination light to the projected image. The light that is not reflected for projection is reflected instead at another direction away from the projection optics and into a light dump. For color images, multiple color light sources are used to illuminate different corresponding images displayed on the SLM in a sequence in the different colors that are projected during a frame display time. Because the human viewing system integrates the light, the viewed image is a color image containing all of the colors.

Images may be projected at a screen, onto the human retina, or for viewing in a far field using phase light modulators (PLMs). Using phase light modulation, a modulated wavefront is produced in the light that is projected towards a screen or to another far field distance for viewing. Phase information displayed on the phase light modulator is a hologram. Due to constructive and destructive interference of light in the traveling wavefront as it traverses the path from the phase light modulator, the projected image appears at the screen, on the human retina, or at a selected far field distance for viewing. PLMs are optically efficient when compared to amplitude modulators, because all of the illumination light is directed for projection, and no light dump is used for any of the illumination light. The PLM device displays phase holograms, which may appear as a randomized pattern when viewed at the PLM, but when the PLM is illuminated, phase modulated light is projected to the screen or at a far field distance, and the projected image appears for viewing due to constructive and destructive interference.

PLMs have physical characteristics that result in noise in a projected image. The contrast ratio of the projected image is limited in part because the phase modulator has a physical bit depth (number of bits per pixel corresponding to physical operation of the pixels of the phase modulator). Using the phase light modulator to modulate light introduces quantization noise, due to a fixed number of positions of the pixels on the phase modulator. Additional noise results when an optimization approach is used to generate phase holograms. The phase holograms are generated in an algorithm that starts from a random initial phase image, which may introduce some noise. The amplitude in the phase plane is fixed, which also introduces noise. These characteristics of projectors using PLMs result in noise in the projected images, lowering the contrast ratio. It is advantageous to increase the contrast ratio in the projected images.

To use a phase light modulator in a projector, phase holograms are generated for display on the phase light modulator. The phase holograms, when illuminated, cause a projected image to appear at a target surface or target plane. Intensity in the image varies due to constructive and destructive interference of the phase modulated light waves reflected from the PLM. The projection of the modulated light from the PLM to the screen or far field imaging plane corresponds to a Fourier transform between a source plane (where the PLM is located) and a target plane (where the projected image appears). The projection path from a phase representation (intensity or amplitude is uniform) at the source plane (where the PLM device is located) transforms the phase hologram to a transformed amplitude and phase image representation corresponding to the projected image in the target plane.

A projector system using a PLM generates phase holograms from amplitude images. The amplitude images may be provided as digital video images retrieved from a memory, received from a computer executing an internet browser, received from a video streaming device, video player, camera, camcorder, game console, or other image source. An algorithm is used for generating the phase holograms to provide bitmap patterns to the PLM. An iterative algorithm that uses Fourier transforms to determine phase information for an image is described in a paper titled "A Practical Algorithm for the Determination of Phase from Image and Diffraction Pictures", R. W. Gerchberg and W. O. Saxton, Cavendish Laboratory, Cambridge, United Kingdom (1971), which is hereby incorporated by reference herein in its entirety. This algorithm is referred to as the "G-S" algorithm. The G-S algorithm uses an iterative loop to optimize the phase information so that the transformed image obtained by the algorithm is within an error threshold from the image to be reproduced. In the G-S algorithm, the phase information is updated at each iteration, and the projected image is optimized repeatedly in an iterative loop, until the transformed image that results from the generated phase information is within an error threshold from the image to be reproduced.

The phase information algorithm has inherent noise due to the fact that in the source plane of the transforms, where the phase representation information is present, the amplitude is fixed. The reconstructed image in the target plane becomes a convolution of the image with the Fourier transform of the inverse of the amplitude in the phase plane, which is a source of noise in the projected images. Further, some noise is introduced by the algorithm's use of a random initial phase image. The random initial phase image can be obtained using a pseudo-random pattern generator, for example. During the optimization process, the G-S algorithm distributes noise in both the dark and bright regions of the projected image as the algorithm iteratively moves the transformed image towards the image to be reproduced by repeatedly modifying the phase information. The presence of this noise, particularly the visible noise in the dark regions of the projected image, reduces the image contrast. The noise can be expressed as the mean of the intensity in a region, and as variance in the intensity of the region. When noise increases, both the intensity mean and the intensity variance increase. When noise decreases, both the intensity mean and the intensity variance in a region decreases.

An approach to improving the contrast in images projected using phase modulation is to allow the amplitude to vary, increasing the number of free variables in the reconstruction plane. In some approaches, regions of the projected image are identified as "don't care" areas where both amplitude and phase may take any arbitrary value. By reducing the number of pixels that are used for the projected image, the number of pixels that need to be accurately represented is reduced, and the noise in the viewable image regions may be reduced. The cost for using these approaches is a reduction in the field of view. In an example referred to as the "Fidoc" algorithm, the algorithm puts a "don't care" band around the image, reducing the size of the image, and the Fidoc algorithm directs the noise into the unused band. While effective in increasing the contrast in the viewed images, the Fidoc algorithm, and other similar approaches, results in less usable field of view, as the usable field of view is reduced by the unused band area.

In the arrangements, an iterative algorithm generates phase holograms that result in increased contrast in projected images. In the algorithm, noise in the projected image is allowed in bright regions of the projected image and noise is reduced or eliminated in the dark regions of the projected image. The intensity mean and the intensity variance in the dark regions is reduced (compared to the G-S approach without the arrangements); while the intensity variance and intensity mean in the bright regions is allowed to increase, and both values are greater in the brighter regions than in the dark regions. The algorithm of the arrangements generates phase holograms which, when used to project an image, use the entire field of view in the projected image. To further reduce noise in the bright regions, in additional arrangements time averaging may be used, where a number of images are sequentially projected using different phase holograms generated by the algorithm. By projecting these images sequentially with varying noise distributions in the bright regions, the noise perceived in the bright regions of the projected images is further reduced. In this way, high contrast images can be produced using the arrangements. Because contrast is a ratio of the intensity in the bright regions to the intensity in the dark regions, as the noise is reduced or eliminated from the dark regions, the dark region intensity decreases, as does the mean of the intensity and the variance of the intensity in the dark regions, increasing the contrast.

In the arrangements, an illumination source provides coherent illumination light. The coherent illumination light is optically coupled to a PLM. The PLM displays phase holograms. The PLM phase modulates the illumination light. The phase modulated light is directed from the PLM to projection optics. In the projection optics, a Fourier optical element optically couples the modulated light from the PLM to an output for the projector. The projected image corresponds to a Fourier transform from the phase hologram displayed on the PLM. For a projected image, an iterative algorithm generates a phase hologram for display on the PLM. In an iterative process for generating the phase hologram, the algorithm weighs the dark regions of the projected target plane image heavier than the bright regions, allowing noise (increased intensity variance and increased mean intensity) in the bright regions of the projected image while reducing or excluding it in the dark regions. The phase holograms determined by the algorithm result in increased contrast in the projected images. The noise that is present in the bright regions of the projected image may be temporally averaged, and therefore reduced, by projecting the image using several different phase holograms in rapid succession. This approach averages random noise in the bright regions, so that the perceived noise in the projected image is reduced. In one example arrangement, a MEMS PLM is used. The MEMS device has a high rate of operation, making temporal averaging in the bright regions of the projected images expedient. In an alternative arrangement, an LCOS PLM is used.

FIG. 1 is a block diagram illustrating a projector 100 using a PLM to project images. In FIG. 1, illumination light is provided by illumination source 101, for example a laser. The illumination light is coherent light. In an example a laser with light output between 405 nanometers and 632 nanometers in wavelength is used. In another arrangement, a laser with visible light is used. Various color lasers may be used. An optical element 103 represents illumination optics, which may include collimators, integrators, fly's eye integrators, optical path extenders, and other optics to provide approximately uniform light to the surface of the PLM 105. A processing element 111 and a digital PLM controller 109 provide phase holograms as bitmaps for display by the PLM. The processing element 111 may be implemented as a processor or microcontroller executing a software program, a digital signal processor or mixed signal processor executing a software program, a dedicated integrated circuit such as an application specific integrated circuit (ASIC), field programmable gate array (FPGA), or complex programmable logic device (CPLD), or a combination of these. The processing element may include volatile or non-volatile memory internally, or may include external memory devices for storing executable code, for storing data for use in generating the phase holograms, or for storing the phase holograms produced by the algorithm. The processing element 111 outputs a phase hologram 102 in a form such as a bitmap pattern, which when used with a PLM to project an image, corresponds to a projected image 107 that is output by the projector 100.

In an example, the PLM 105 is a MEMS PLM device. The MEMS PLM includes an array of addressable storage elements associated with individual MEMS micromirrors that have multiple vertical positions (vertical with respect to a reflective surface of the device when the device is facing upwards). The micromirrors may be used to modulate the phase of illumination light and, when illuminated, output phase modulated light. In the illustrated example, the PLM 105 is reflective and the phase modulated light is directed to projection optics 106. The projection optics 106 is arranged to display an image 107 at a viewing distance, for example by projecting the image onto a screen, onto a human retina, onto a display medium, a wall or at a far field in a field of view. The relationship between the phase hologram at the PLM and the projected image may be expressed as Fourier transforms, and the projection optics 106 is sometimes referred to as a "Fourier lens." The projected image 107 has amplitude and phase even though the bitmap displayed on the PLM is a phase hologram. The phase hologram may appear as a random bitmap or as noise when viewed on the PLM. The intensity observed in the projected image resembles a natural image to the human vision system, despite the stochastic nature of the phase hologram displayed on the PLM. Alternative illumination sources may be used, such as a super luminescent diode. For a color projection system, multiple color light sources may be used to illuminate phase holograms displayed by the PLM in a sequence to provide a color image. In an example red, green and blue lasers may be used to independently illuminate the PLM in a sequence of sub frames while the PLM displays phase holograms for each color. The projected image is then a color image.

As shown in FIG. 1, a single illumination source 101 is used, for example a blue-violet laser diode may be used. The laser diode for blue color may have an output of wavelength around 400 nanometers, for example 405 nanometers. Blue laser diodes are commercially available in TO-can packages and may include a cover lens, such as a collimator, to improve the coherence of the output beam. In alternative arrangements laser diodes having other color outputs of differing colors and at different wavelengths may be used. Visible laser light of any color may be used. Light that is not visible to the human vision system, such as infrared light, may be used for projecting signals, and for ranging applications.

Figure 2A:
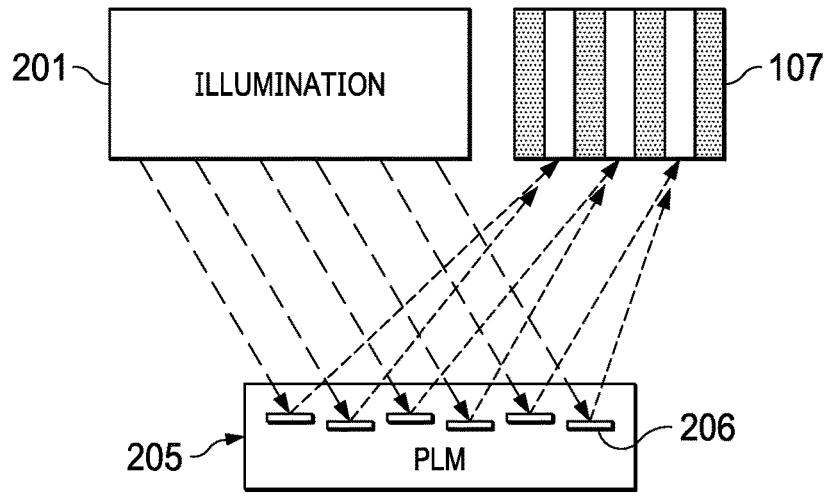
FIG. 2A is a block diagram illustrating projection of an image using a phase light modulator.
Figure 2B:
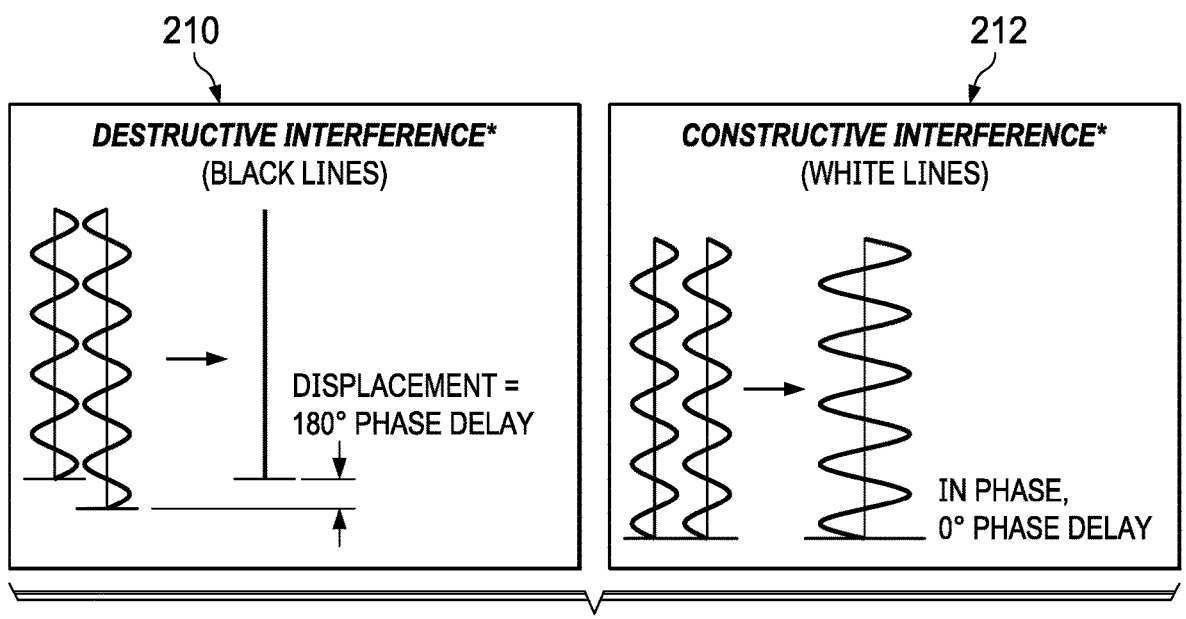
FIG. 2B illustrates destructive and constructive interference for in phase and out of phase light.

FIGS. 2A-2B illustrate the operation of a PLM device to project an image. In FIG. 2A, a MEMS PLM 205 is shown with micromirrors 206 arranged as pixels that have programmable vertical (as oriented in FIG. 2A) displacement. MEMS PLM 205 phase modulates the light from illumination source 201. The phase modulated light is reflected from the PLM and is projected to provide a projected image 107 at a target plane. As shown in FIG. 2B, the wavefront produced by modulating the illumination light may exhibit destructive interference (see block 210 in FIG. 2B) at a target plane, a plane where the projected image is to be viewed. The projected image has dark regions, the waves cancelling out at the target plane to provide black lines (dark regions have lesser or minimum intensity). Alternatively, the wavefront of phase modulated light may have constructive interference, as shown (see block 212 in FIG. 2B) where the waves are in phase and add together to provide white lines in the image at the target plane (bright regions have greater or maximum intensity).

Figure 3:
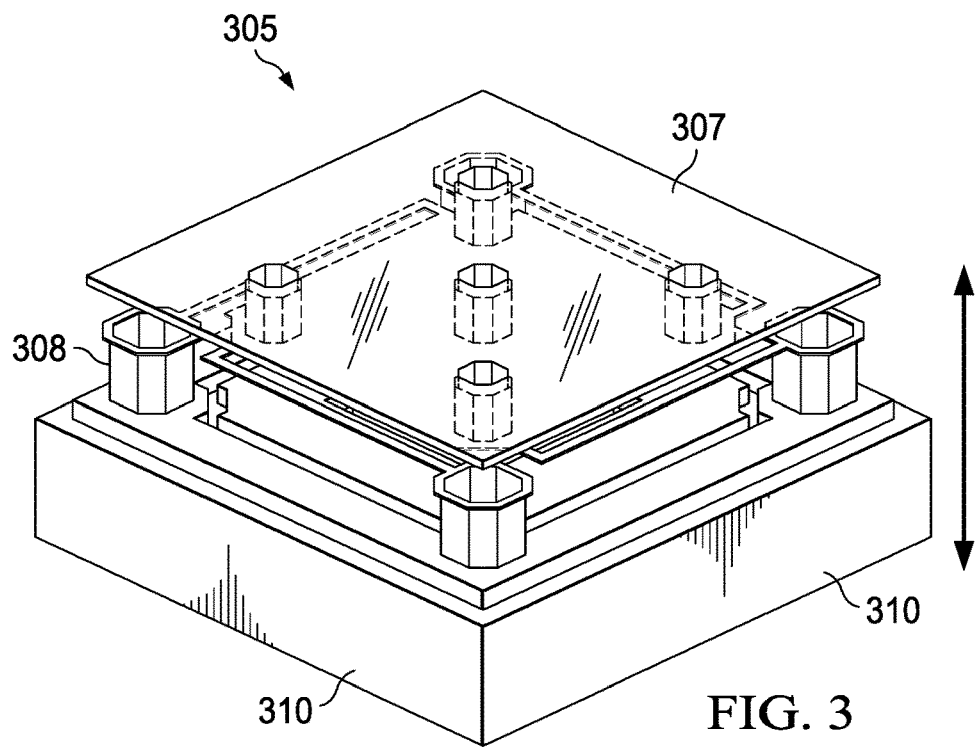
FIG. 3 is a projection view illustrating a picture element of a micro-electro-mechanical (MEMS) device phase light modulator that is useful with the arrangements.

FIG. 3 illustrates a single pixel 305 for a MEMS PLM device, for example the MEMS PLM 205 illustrated in FIG. 2A. In FIG. 3, a micromirror 307 is formed over pistons 308 that move in response to a stored voltage from corresponding storage cells (not shown). The storage cells are located in a semiconductor substrate 310 beneath the micromirror 307. The micromirror 307 may have a surface of aluminum, for example. Aluminum, gold, silver, copper and other metal or dielectric reflective coatings may be used. Storage cells in the semiconductor device formed on the semiconductor substrate 310 beneath the micromirror 307 (not shown) store one or more bits of information. A voltage output from the storage cells drives the pistons 308 to cause the MEMS device to vertically displace the micromirror 307 to one of several positions. The bit depth of the storage cells, and the type of MEMS device for pixel 305, will determine the number of different positions the micromirror may take, and thus determine the resolution the pixel may provide. Quantization noise will result when the pixel 305 is used to phase modulate light, because the micromirror 307 does not move continuously to a range of positions, but instead moves in steps corresponding to levels of the voltage output by the storage cells.

In operation, a MEMS PLM device, which has thousands, hundreds of thousands, or even more micromirror pixel elements arranged in rows and columns, stores patterns in individually addressable storage cells arranged in an array to correspond with the pixels. Bitmap patterns for phase holograms may be loaded into the storage cells from a device controller. The PLM is then updated to display a phase hologram based on the stored pattern. The PLM is used to phase modulate illumination light to produce the projected image to be viewed in the target plane. This operation is repeated for each projected image. Pulse width modulation (PWM) of the illumination source may be used with the PLM to display sub-frame images in a sequence to further improve the projected image, reduce heat in the system, and reduce stress on the pixels. Multiple colors can be used with sub-frame images of differing weight (longer or shorter display times) to produce color projected images by using multiple color illumination sources, for example red, green and blue color sources, to form color projected images.

FIG. 4 illustrates in a cross sectional view a liquid crystal on silicon (LCOS) PLM device 405. Liquid crystals 409 are sealed by glue and spacers 421 in a liquid crystal layer 411 between a glass layer 413 and a semiconductor layer 415. An aluminum pixel array layer 417 between the liquid crystal layer 411 and the semiconductor layer 415 has electrodes arranged in rows and columns beneath the liquid crystal layer 411. In a manner similar to the operations for the MEMS PLM, a phase hologram pattern is stored in an array of addressable storage cells (not shown) in the semiconductor layer 415. Pixels in the aluminum pixel array layer 417 conduct voltages based on the data stored in the storage cells. The liquid crystals 409 twist (or don't twist) in response to voltages conducted by the pixels in the aluminum pixel array layer 417 from the storage cells in the semiconductor layer 415. A transparent conductive layer 419 of indium-tin-oxide (ITO) provides a light path and forms an electric conductor. The LCOS PLM modulates illumination light by displaying a phase hologram and reflects the modulated light. The modulated light is then projected to form an image in the target plane.

FIG. 5 illustrates in a block diagram a detailed view of a PLM projector system 500. In FIG. 5, illumination source 101, for example a laser, provides coherent illumination light. Optical element 103 optically couples the laser to an optical steering element 504. Optical steering element 504 is reflective and transmissive. The optical steering element 504 has a surface that is reflective to light that comes from illumination source 101 striking the optical steering element 504 at an acute angle, and that is transmissive to phase modulated light from the PLM 105 which strikes the optical steering element at a different angle. PLM 105 displays phase hologram 102. A polarizer, quarter wave plate 505, receives light from the illumination source 101 and illumination optics (optical element 103) that is reflected by the optical steering element 504. By rotating the polarization of the light that is coupled to the pixels of the PLM 105, the quarter wave plate 505 contributes to separating the illumination light to the PLM 105, which traverses the quarter wave plate one time, and from the phase modulated light leaving the PLM, which traverses the quarter wave plate a second time. The phase modulated light traverses the quarter wave plate 505, is transmitted through the optical steering element 504, and is coupled by the projection optics 106 to project image 107.

In operation, phase holograms are generated for images to be projected for display on the PLM. Using these phase holograms to modulate the illumination light creates projected images output by the projector system (see 500 in FIG. 5, or 100 in FIG. 1). The intensity images are stored and available to the system, for example, as digital video images. The digital video images may be part of a presentation, movie, television show, game, or streaming video stored as a sequence of digital video images.

As described above, one prior approach to generating phase information for images is to use the G-S algorithm. The G-S algorithm performs an iterative approach that takes advantage of the fact that a change in either the amplitude or phase in one domain of the Fourier transform, for example a source plane corresponding to where the PLM is located, results in changing both amplitude and phase distributions in the opposite domain of the Fourier transform, for example the target plane where a projected image is shown. Therefore changes in the phase hologram in a source plane (corresponding to where the PLM modulates illumination light) may affect changes in both amplitude and phase in the image at a target plane (where a screen or other display plane receives the projected image). In this way, a phase hologram for a projected image may be determined, and phase light modulators may produce arbitrary images projected in the target plane. More than one phase hologram may be used to project a given target image. In the iterative G-S algorithm a random phase hologram is used as a starting point in the phase plane. Differences in the random starting phase information may result in different solutions for the phase hologram for a given target image. The G-S algorithm error (a difference between an image generated using the phase information from the algorithm, and the target image) decreases with iterations, and so the algorithm converges.

In the G-S algorithm, a random initial phase hologram is generated for the first iteration of the algorithm. This can be done using a pseudo-random pattern generator, for example. For the index k, where k is a positive integer starting at "1" and incrementing by 1 for each iteration, the phase term $e^{j\Phi_{source,k}}$ is transformed to a transformed target image by a Fourier transform. The Fourier transform corresponds to the operation of a lens and transmissive paths in a projector from a phase light modulator to the projected image. In the target plane the resulting expression after the Fourier transform has amplitude and phase $\sqrt{I_{target,k}} \times e^{j\Phi_{target,k}}$. At this stage, an error threshold comparison may be made using the transformed amplitude or intensity image obtained by the algorithm after the current kth iteration. The error is determined by comparing the transformed image obtained by the algorithm in the target plane to the goal image. If the error exceeds a selected threshold, the algorithm continues. The G-S algorithm replaces the amplitude in the transformed image term with the amplitude $I_{Update}$. The expression in the target plane is now modified to $\sqrt{I_{Update}} \times e^{j\Phi_{target,k}}$. In the G-S algorithm, the replacement amplitude $I_{Update} = I_{goal}$, so the amplitude term is in the transformed image is updated with the intensity of the goal image, which is the image to be projected. An inverse Fourier transform then returns the updated terms to the source plane, resulting in the expression $\sqrt{I_{source,k}} \times e^{j\Phi_{source,k}}$. The phase term $e^{j\Phi_{source,k}}$ of this expression now becomes the phase hologram for the kth iteration. The index k is incremented, and the algorithm iterates again. In this iteration, the algorithm uses the new phase term $e^{j\Phi_{source,k}}$ for the phase hologram.

If, after an iteration, the error threshold that is determined by comparing the amplitude image output by the algorithm after k iterations to the goal image is below a threshold, the algorithm ends. The final phase term $e^{j\Phi_{source,k}}$ is a phase hologram that may be used to project the image in a phase modulation projector system.

The G-S algorithm is an optimization algorithm. In the G-S algorithm, the amplitude of the image obtained from the algorithm is made to be within an error threshold of the goal image intensity. Noise in the projected image produced by the G-S algorithm is distributed in both the dark and bright regions of the projected image. This noise, which is caused in part by the variable phase with uniform amplitude nature of the source plane information in the G-S optimization, results in reduced contrast in the projected image. In some applications, for example heads up displays (HUDs), high contrast is very advantageous. Improvement in the contrast ratio obtained in the projected image is beneficial, particularly for these applications.

FIG. 6 illustrates a sample projected image 650 obtained from a method arrangement for generating phase holograms. In the arrangements, noise (variance in intensity) is restricted to the bright regions of the projected images, increasing the contrast ratio. In the arrangements, a phase hologram is generated by an algorithm so that in the corresponding projected image, noise is allowed in the bright regions, and at least partially excluded from the dark regions, increasing the darkness of the dark regions, and thus, increasing the contrast in the projected image. In additional arrangements, the noise that is present in the bright regions of the projected image obtained using the arrangements may be further compensated by displaying multiple phase holograms generated for a projected image by the method in succession. These differing phase holograms result in projected images with differing noise patterns in the bright regions, the noise in the projected images is time averaged so that in the projected images the noise in the bright regions is reduced.

Figure 7:
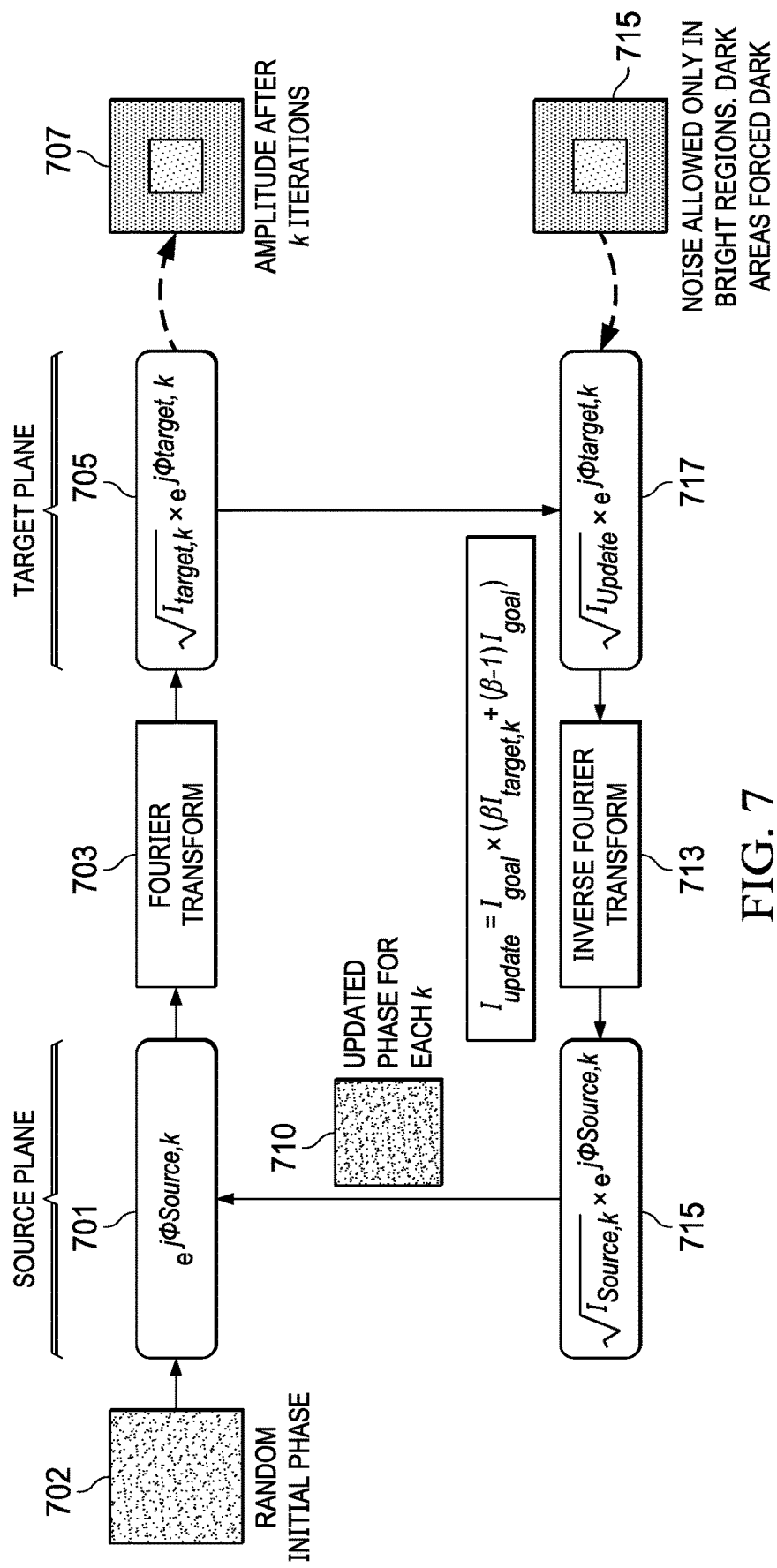
FIG. 7 is a flow diagram illustrating an iterative algorithm of an arrangement that determines phase holograms for use in projecting images with a phase light modulator.

FIG. 7 illustrates in a diagram the operation of a phase hologram generation algorithm of the arrangements. The steps of FIG. 7 may be performed by the processing element 111 illustrated in FIG. 1. In FIG. 7, a phase hologram is in a source plane (the plane where, in a projector, the PLM is located) and an amplitude image is present in a target plane where a screen or display is located. The amplitude image is related to the phase hologram by Fourier transforms. A random initial phase hologram is produced at step 702, expressed as $e^{j\Phi_{source,k}}$. The random initial phase hologram may be produced using a pseudo random pattern generator, for example. At step 701, an iterative algorithm begins. In the first iteration the random initial phase hologram from step 702 is used, while in subsequent iterations, the phase term used is the output from the previous iteration. At step 703 a Fourier transform is performed on the phase hologram produced in the step 702 (in the first iteration, and the output phase hologram 710 in later iterations). At step 705, in the target plane, the transformed amplitude and phase expression obtained from the Fourier transform in step 703 is shown as $\sqrt{I_{target,k}} \times e^{j\Phi_{target,k}}$, the corresponding amplitude image 707 is shown.

At step 717, the amplitude term is updated. In the arrangements, the expression used to update the amplitude is:

$$I_{update} = I_{goal} \times (\beta I_{target,k} + (\beta - 1) I_{goal})$$

where $I_{goal}$ is a binary (0, 1) amplitude image corresponding to the image that is to be projected, the goal image, and $\beta$ is a weighting factor between 0 and 1. The new amplitude term $I_{update}$ is a weighted sum of the goal image amplitude (715) and the kth target image (shown as 707) output by the algorithm. The term $I_{target,k}$ is the amplitude 707 obtained at 705 for the current iteration in the target plane. Note that the intensity image $I_{goal}$ is a binary (0, 1) amplitude image, so that for dark regions with amplitude 0, the updated intensity $I_{update}$ is always 0; in contrast for regions in the intensity image $I_{goal}$ with amplitude 1, the updated intensity $I_{update}$ is the product of the amplitude of the goal image (1 for bright regions) with the weighted sum of the intensity in the current image obtained from the algorithm and the intensity of the goal image. The algorithm insures that noise is at least partially excluded from dark regions of the projected image in the target plane, while in the bright regions; the weighted sum allows noise to exist. This approach results in higher contrast in the projected images.

At step 713, the inverse Fourier transform is performed, and this returns the source plane expression with amplitude and phase $\sqrt{I_{source,k}} \times e^{j\Phi_{source,k}}$ shown at goal image amplitude 715. At step 701, the updated phase term $e^{j\Phi_{source,k}}$ (710) is used to perform the next iteration, and the integer index k is incremented.

The algorithm shown in FIG. 7 generates a phase hologram shown as 710. When used to project an image in a PLM, the phase hologram results in an image in the target plane with noise at least partially excluded from the dark regions, and with noise allowed in the bright regions. The algorithm of FIG. 7 compares the current amplitude image 707 to the goal image amplitude 715, and when the current amplitude image 707 is within an error threshold of the amplitude of the goal image 715, the algorithm is complete. Convergence may take several or even many iterations. By weighting the dark regions heavier in the optimization algorithm, the noise is directed to the bright regions. In additional arrangements, multiple phase holograms for a single projected image are generated using the algorithm, and these phase holograms are displayed in a sequence to use temporal averaging to reduce the visible noise in the bright regions. Because the noise in the bright regions is random due to the random initial phase holograms used, these multiple projected images will have noise distributed differently in the bright regions, and time averaging of these images may cancel the perceived noise in the visible image.

Figure 8:
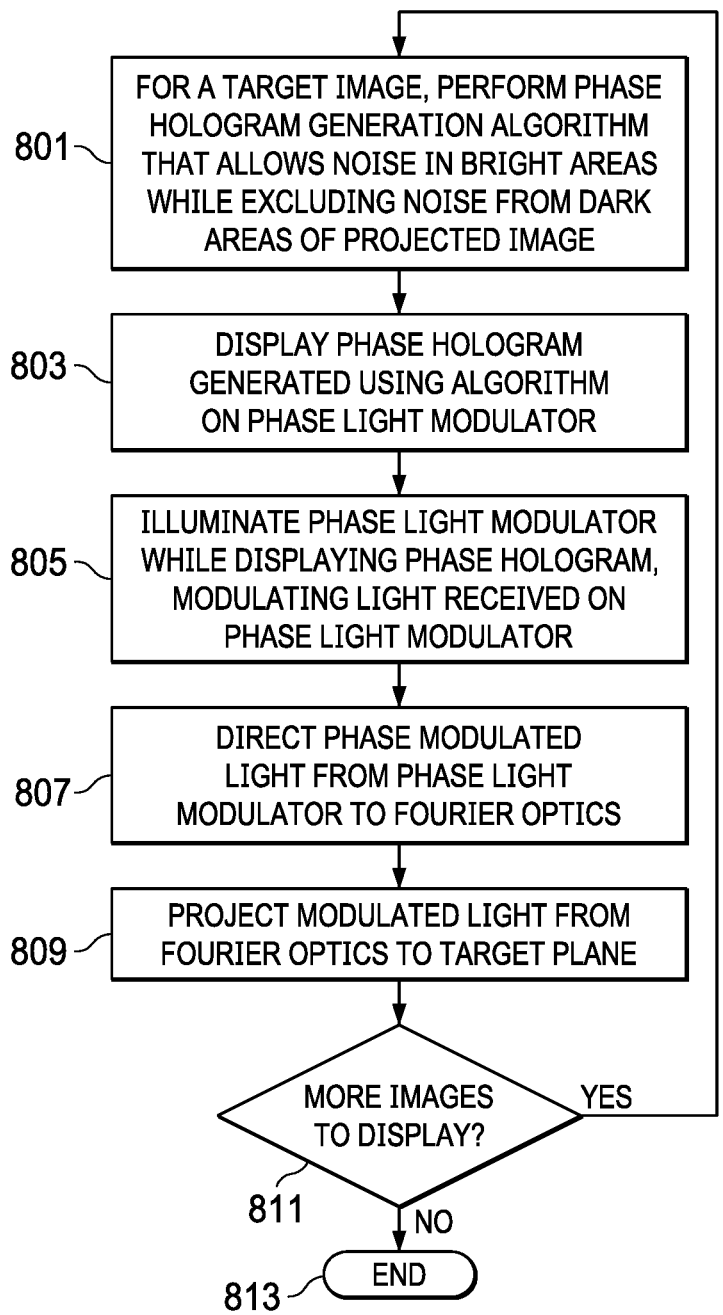
FIG. 8 is a flow diagram illustrating a method arrangement.

FIG. 8 is a flow diagram that illustrates a method for projecting images using an arrangement. The steps may be performed by the projector system shown in FIG. 1, for example. At step 801, for an image that is to be projected, the phase hologram generation algorithm of FIG. 7 is performed. The algorithm is performed, for example, by processing element 111 shown in FIG. 1. The algorithm generates a phase hologram that, when projected by modulating illumination light at a PLM while displaying the phase hologram, results in a projected image that at least partially excludes noise from the dark regions in the projected image, while noise is permitted in the bright regions. In some examples, the phase hologram is stored in a memory for later retrieval and use. At step 803, the phase hologram developed by the algorithm is displayed on the PLM. The phase hologram is obtained, for example, by receiving the phase hologram from the processing element 111 performing step 801, or the phase hologram may be read from memory by the digital PLM controller 109 (see FIG. 1). At step 805, illumination light is directed onto the PLM while the phase hologram image is displayed. The illumination source, see 101 in FIG. 1, for example a laser, provides coherent light to the PLM 105 in FIG. 1. At step 807, phase modulated light is directed into Fourier optics. As shown in FIG. 1, projection optics 106 receives the phase modulated light from the PLM 105. At step 809 the light from the projection optics 106 is projected to the target plane and an image is displayed. In FIG. 1, a projected image 107 is shown projected by the system 100. At step 811, the method determines whether additional images are to be displayed, and if the determination is yes, the method returns to step 801 and repeats for each image to be displayed. If the determination is that additional images are not to be displayed, the method ends at block 813.

The phase hologram generation in step 801 may be done before the rest of the steps of FIG. 8 starting with 803 are performed. In this approach the phase holograms are generated offline, and the resulting phase holograms may be stored in a memory to be retrieved by the digital PLM controller 109 in FIG. 1, for example. The phase holograms may then be retrieved for display on the PLM at step 803. Alternatively, digital video images to be projected may be stored, and as the digital video images are retrieved from storage by the digital PLM controller 109, phase holograms may be generated one by one by the processing element 111, as shown at step 801. The phase holograms are not unique with respect to the projected images, as described above the algorithm for generating the phase holograms begins with a random initial phase hologram, so that many different phase holograms may be generated that may be used to project a given image.

Figure 9:
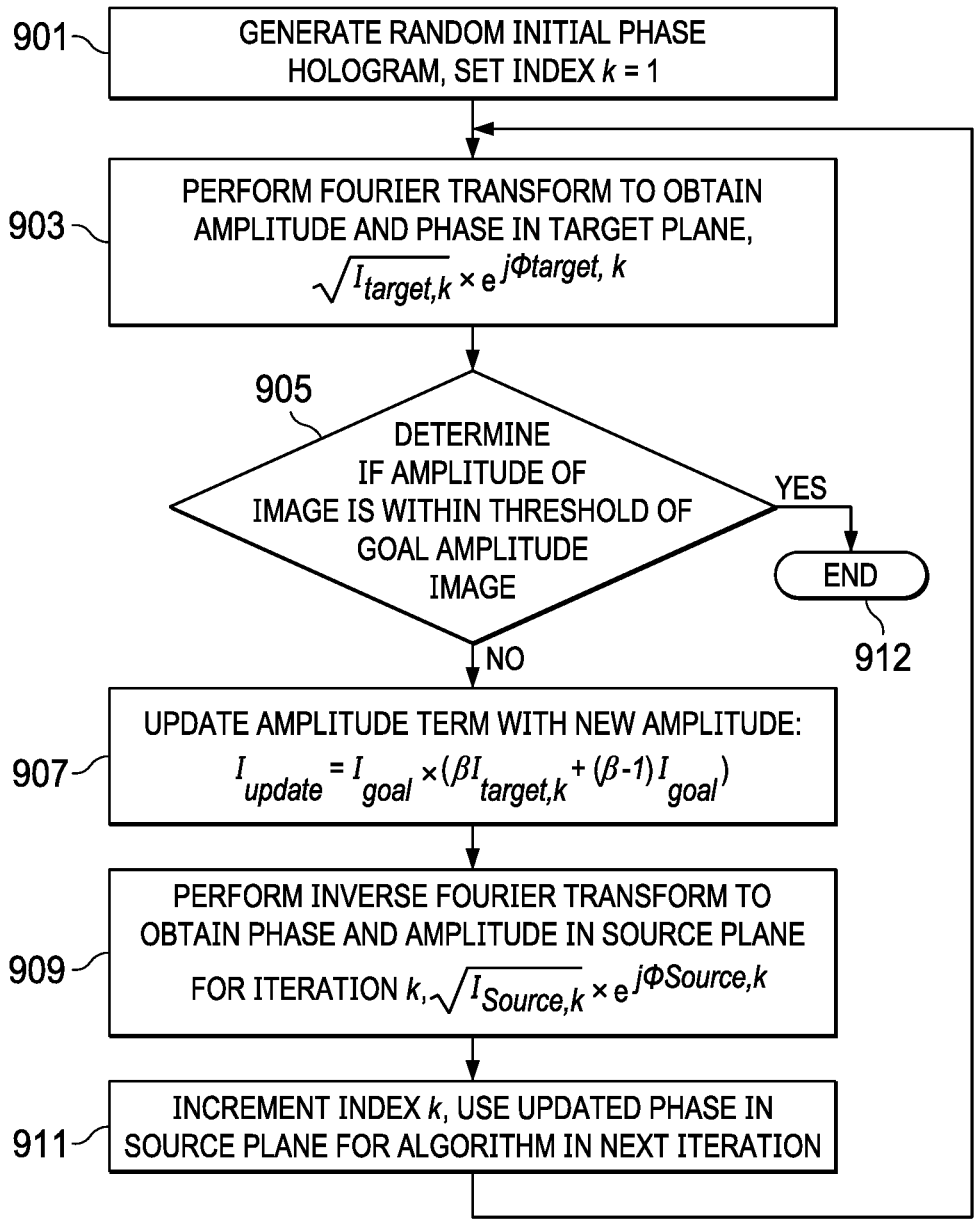
FIG. 9 is a flow diagram illustrating a method for an algorithm of an arrangement.

FIG. 9 illustrates in a flow diagram a method for performing the phase hologram generation of step 801 in FIG. 8, and as shown in FIG. 7. The steps of FIG. 9 can be performed by the processing element 111 illustrated in FIG. 1, for example. At step 901, a random initial phase hologram is generated. The index k is then set to 1.

At step 903, the iterative algorithm starts by performing a Fourier transform to obtain the transformed amplitude and phase terms $\sqrt{I_{target,k}} \times e^{j\Phi_{target,k}}$. The amplitude of the current image generated by the algorithm is compared to the amplitude of the goal image to be projected in step 905. If an error threshold is met, the algorithm ends at step 912. If the error threshold is not met, the algorithm continues to step 907.

At step 907, as described above, the amplitude term of the transformed image is updated as described by the equation:

$$I_{update} = I_{goal} \times (\beta I_{target,k}) + (\beta - 1) I_{goal}).$$

At step 909, the updated amplitude is used with the phase term, and an inverse Fourier transform is performed to return the expression to the source plane, so the expression with amplitude and phase is:

$$\sqrt{I_{source,k}} \times e^{j\Phi_{source,k}}.$$

At step 911, the index k is incremented, and the algorithm returns to step 903, the Fourier transform using the updated phase hologram to begin the next iteration.

The algorithm continues iteratively, updating the phase hologram in the source plane, performing Fourier transform on the source plane phase hologram to a transformed phase and amplitude term, and checking the error in the amplitude by comparing to the goal image amplitude and comparing the error to an error threshold, until the error is less than the error threshold. When the algorithm ends at step 912, the final phase hologram is ready for use in projecting the goal image.

Figure 10:
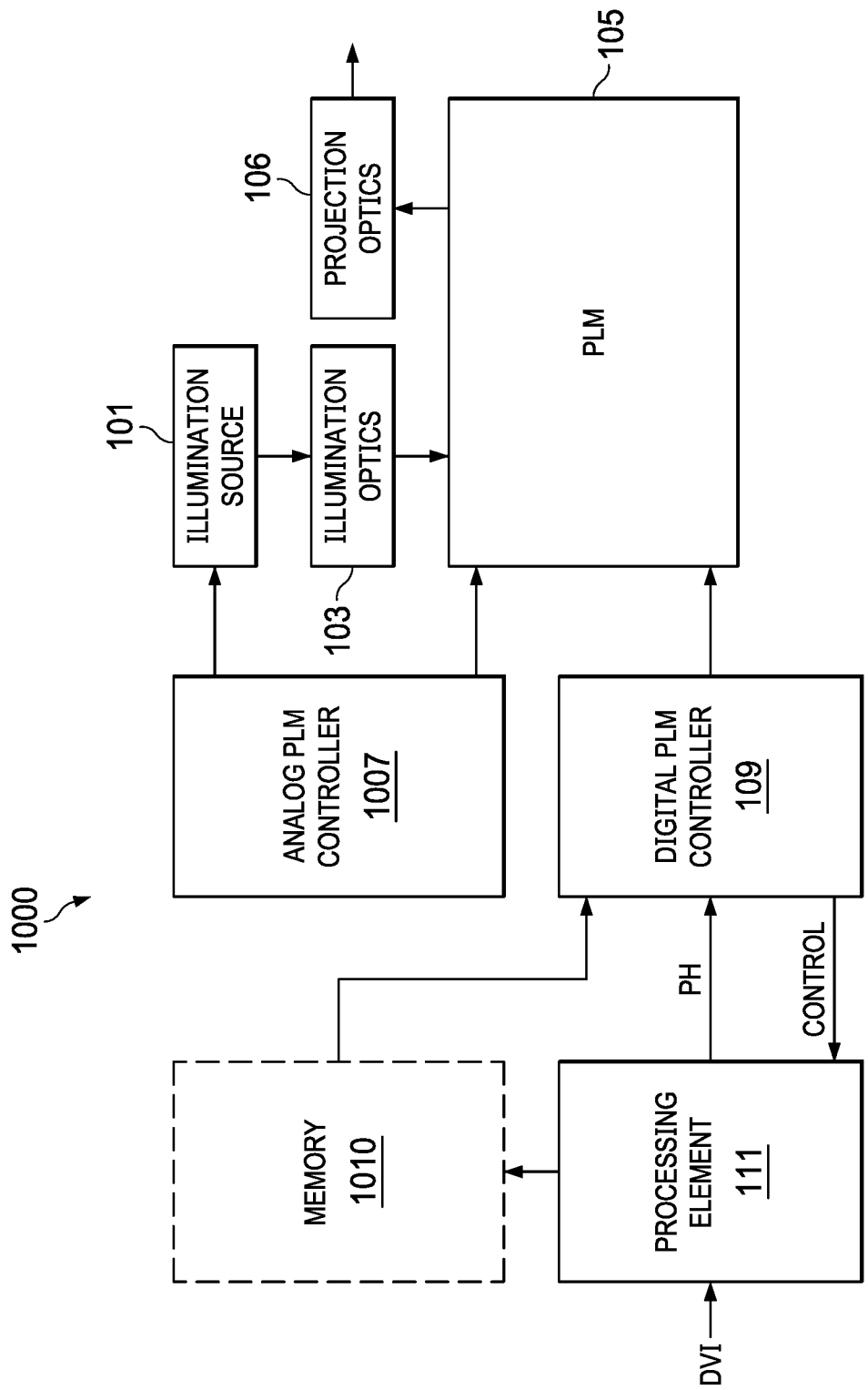
FIG. 10 is a block diagram for a circuit useful with the arrangements.

FIG. 10 is a circuit diagram of an example arrangement 1000 phase modulated projection system as described above (see projector 100 in FIG. 1, for example and the text at paragraphs 0042-0051, and for using the methods of FIGS. 7, 8 and 9. A processing element 111 performs the algorithm shown in FIG. 7 and the steps in the flow diagram of FIG. 9 to generate phase holograms from digital video images received on input digital video input (DVI). The processing element 111 may be controlled by the digital PLM controller 109 using the signal CONTROL. The processing element 111 may store phase holograms in memory 1010 for later retrieval by the digital PLM controller 109. The memory 1010 is optional; in an alternative arrangement the processing element 111 generates the phase holograms and transmits the phase holograms on signal PH to the digital PLM controller 109 on a one by one basis. A variety of sources may provide the DVI signal in FIG. 10, such as Internet browsers, stored files in video cards, flash cards, universal serial bus (USB) drives, solid state drives (SSDs), cameras, personal computers, game consoles, smartphones, and camcorders. A processor, for example a microprocessor, a mixed signal processor, a digital signal processor (DSP), a microcontroller unit (MCU) or other programmable device executes instructions that cause it to perform the algorithm to implement the processing element 111 and to generate phase holograms. A dedicated integrated circuit such as an application specific integrated circuit (ASIC), field programmable gate array (FPGA), or complex programmable logic device (CPLD) may be used as processing element 111. The processing element 111 outputs the phase holograms as digital bitmap signals "PH" for display on the PLM 105. The processing element 111 is coupled to a digital PLM controller 109, which may be a digital video processing integrated circuit. An analog PLM controller 1107 controls intensity and power of the illumination source 101. The digital PLM controller 109 provides digital data to the PLM 105. The PLM 105 modulates phase of the illumination light that strikes the surface of the PLM, which is reflective, and the analog PLM controller 1107 provides power and analog signals to the PLM 105. The light from the illumination source 101 such as a laser is coupled to the PLM 105 by illumination optics (optical element 103). The reflected phase modulated light for projection leaves the surface of the PLM 105 and travels into the projection optics 106 for projection by the system 1100.

The phase light modulator PLM 105 may be an LCOS SLM. PLM 105 may also be implemented using a MEMS PLM device. The PLMs have individually addressable pixels that modulate phase of illumination light, and output the phase modulated light.

Although the example illustrative arrangements have been described in detail, it should be understood that various changes, substitutions and alterations may be made herein without departing from the spirit and scope of the present application as defined by the appended claims. For example, where a single laser diode was shown, multiple laser diodes or an array of laser diodes may be used. Accordingly, the appended claims are intended to include within their scope processes, machines, manufacture, compositions of matter, means, methods, or steps that provide equivalents to the examples disclosed.

What is claimed is:

1. A projection system comprising:
    an illumination source configured to output illumination light;
    a processing element configured to:
        obtain a digital image having a dark region and a bright region; and
        produce a phase hologram based on the digital image comprising adding noise comprising first added noise in the dark region and second added noise in the bright region, the dark region having a first intensity and first added noise, the bright region having a second intensity and second added noise, the second intensity greater than the first intensity and the second added noise greater than the first added noise; and
    a phase light modulator (PLM) coupled to the processing element and optically coupled to the illumination source, the PLM configured to:
        receive the illumination light; and
        phase modulate the illumination light based on the phase hologram, to produce modulated light to produce an image at a viewing distance, wherein the phase hologram causes the image to have a dark region and a bright region.

2. The projection system of claim 1, wherein producing the phase hologram comprises:
    producing an iterative phase hologram having a random initial phase;
    producing a binary goal image based on the digital image; and
    iteratively:
        performing a Fourier transform on the iterative phase hologram to produce a target plane image;
        in response to determining that the target plane image is within an error threshold of the digital image, produce the phase hologram based on the iterative phase hologram; and
        in response to determining that the target plane image is not within the error threshold of the digital image:
            producing an updated image based on the binary goal image and the target plane image; and
            performing an inverse Fourier transform based on the updated image to produce the iterative phase hologram for a next iteration.

3. The projection system of claim 1, wherein the processing element is further configured to produce the phase hologram by:
    producing a binary goal image based on the digital image; and
    producing the phase hologram based on the binary goal image.

4. The projection system of claim 3, wherein producing the binary goal image comprises:
    setting a bit of the binary goal image to a first value when a corresponding pixel of the digital image is in a bright region of the digital image; and
    setting the bit of the binary goal image to a second value when the corresponding pixel of the digital image is in a dark region of the digital image.

5. The projection system of claim 1, wherein the phase hologram is a first phase hologram, and wherein the processing element is further configured to produce a second phase hologram responsive to the digital image, and wherein the PLM is configured to phase modulate the illumination light based on the second phase hologram.

6. The projection system of claim 1, further comprising projection optics optically coupled to the PLM.

7. A method comprising:
    providing illumination light from an illumination source;
    obtaining, by a processing element, a digital image having a dark region and a bright region;
    producing, by the processing element, a phase hologram based on the digital image comprising adding noise comprising first added noise in the dark region and second added noise in the bright region, the dark region having a first intensity and first added noise, the bright region having a second intensity and second added noise, the second intensity greater than the first intensity and the second added noise greater than the first added noise;
    receiving the illumination light on a phase light modulator; and
    modulating, by the phase light modulator, the illumination light, to produce a projected image based on the phase hologram.

8. The method of claim 7, wherein producing the phase hologram further comprises:
    producing, by a processing element, an iterative phase hologram having a random initial phase;
    producing a binary goal image based on the digital image; and
    iteratively:
        performing a Fourier transform on the iterative phase hologram to produce a target plane image;
        in response to determining that the target plane image is within an error threshold of the digital image, produce the phase hologram based on the iterative phase hologram; and
        in response to determining that the target plane image is not within the error threshold of the digital image:
            producing an updated image based on the binary goal image and the target plane image; and
            performing an inverse Fourier transform based on the updated image to produce the iterative phase hologram for a next iteration.

9. The method of claim 7, and further comprising displaying multiple phase holograms on the phase light modulator corresponding to a goal image.

10. The method of claim 7, wherein displaying the phase hologram on the phase light modulator comprises displaying the phase hologram using a phase light modulator comprising a liquid crystal on silicon (LCOS) phase light modulator or a micro-electro-mechanical system (MEMS) phase light modulator.

11. The method of claim 7, wherein producing the phase hologram based on the digital image comprises:
   producing a binary goal image based on the digital image; and
   producing the phase hologram based on the binary goal image.

12. The method of claim 11, wherein producing the binary goal image comprises:
   setting a bit of the binary goal image to a first value when a corresponding pixel of the digital image is in a bright region of the digital image; and
   setting the bit of the binary goal image to a second value when the corresponding pixel of the digital image is in a dark region of the digital image.

13. The method of claim 7, wherein the phase hologram is a first phase hologram, and the method further comprising:
   producing a second phase hologram responsive to the digital image; and
   phase modulating the illumination light based on the second phase hologram.

* * * * *